July 23, 1963  P. PERUCCA  3,098,424
MACHINE FOR THE PREPARATION OF COFFEE INFUSION
Filed April 6, 1961  2 Sheets-Sheet 1

July 23, 1963    P. PERUCCA    3,098,424
MACHINE FOR THE PREPARATION OF COFFEE INFUSION
Filed April 6, 1961    2 Sheets-Sheet 2
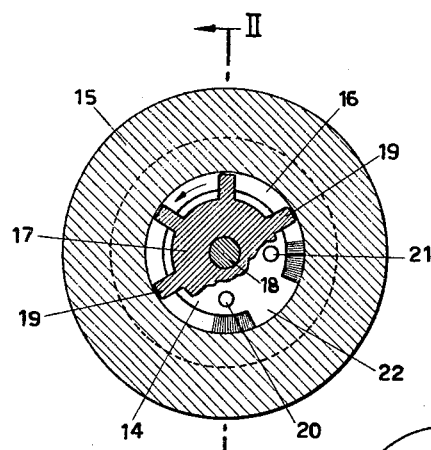
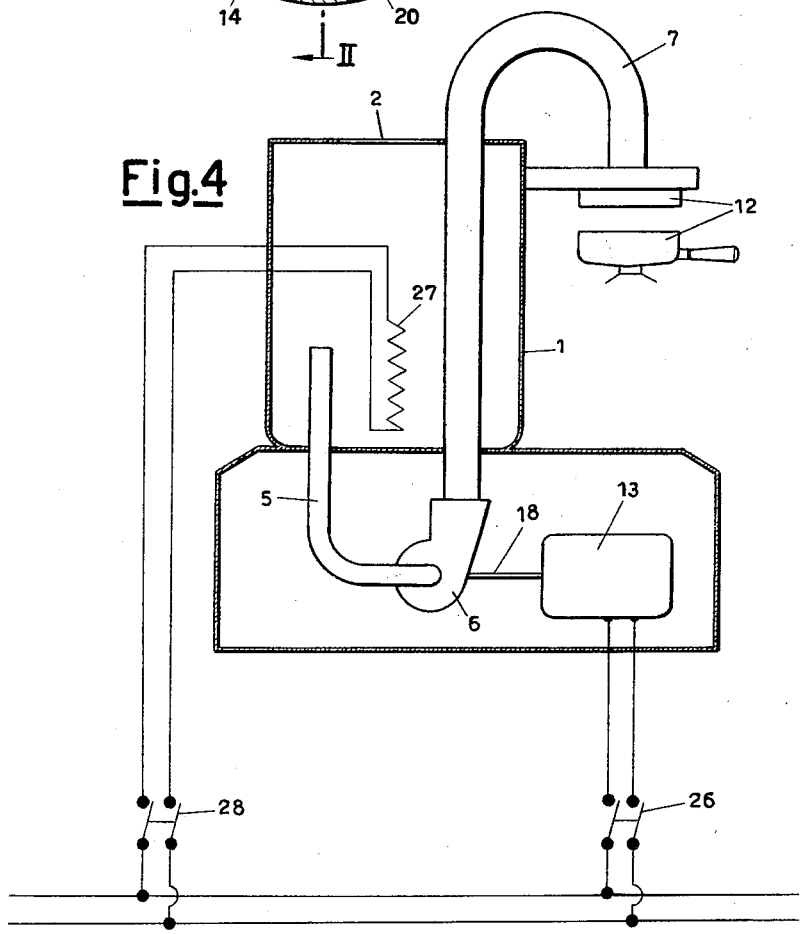

United States Patent Office 3,098,424
Patented July 23, 1963

3,098,424
MACHINE FOR THE PREPARATION OF
COFFEE INFUSION
Pietro Perucca, Via P. Sarpi 1, Milan, Italy
Filed Apr. 6, 1961, Ser. No. 101,246
Claims priority, application Italy Apr. 12, 1960
4 Claims. (Cl. 99—302)

This invention relates to espresso coffee machines.

All existing espresso coffee machines comprise an apparatus for the purpose of supplying hot water at a pressure constantly maintained at the required level, and a tap which intercepts said water under pressure in such a manner that the opening of this tap admits water into a filter for the length of time necessary.

According to the present invention, the water is sent to the filter by means of a pump which is positively controlled so as to function to send water to the filter for the length of time necessary for the production of the desired quantity of infusion, without there being any interception of the flow of water between the pump and the filter.

If it is desired to do without an intercepting tap placed immediately above the filter containing the coffee powder, there arises the disadvantage that when the pump stops, a noticeable quantity of water remains trapped between the pump and the filter; consequently, when it is desired to remove the exhausted coffee powder, said quantity of boiling water, or a considerable part thereof, is discharged together with the powder, thus rendering the operation difficult and awkward.

In order to remove this drawback and thus provide a machine of the aforementioned type which can be used with advantage in practice, according to the present invention, the filter is placed on a higher level than that of the water reservoir, which is constantly in communication with the atmosphere, and the pump is of the rotary hydrodynamic type without sealing, such as a centrifugal or liquid friction pump like the one described in Italian Patent No. 402,961.

With this arrangement, the control of the infusion process can be made very convenient using, for example, a switch or push-button for the pump motor, which can also be automatically controlled, for example by the presence of a cup under the filter. Furthermore, the important advantage is obtained that, when the pump stops working, the water remaining in the piping below the pump falls back by hydrostatic action, with the consequence that the used coffee powder does not remain impregnated with water.

The open tank containing the reserve water can have its water already heated—though obviously to less than 100° C.—or the water may be cold or tepid; in the latter case it is necessary to provide a heating element for the water delivered by the pump, and even in the first case such an element may be advisable.

In the accompanying drawing there is shown for illustrative purposes an apparatus according to a preferred embodiment of the invention.

FIG. 4 shows schematically another embodiment of the invention.

Figure 1:
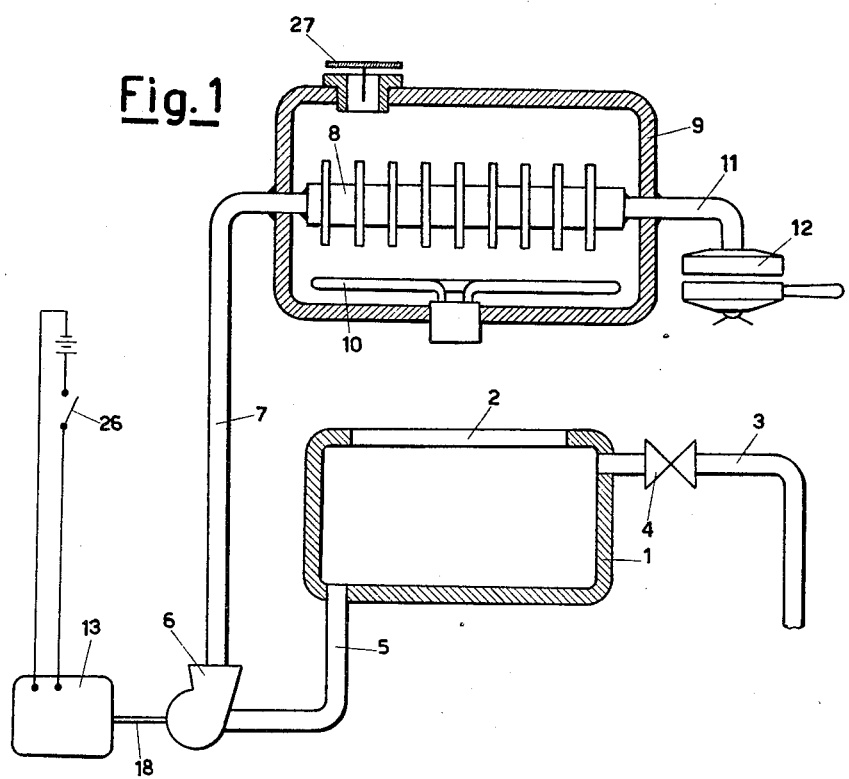
FIG. 1 is a diagrammatic representation of an apparatus according to the invention.

The apparatus shown consists of a water reservoir 1, open at 2, containing water fed by the pipe 3 which is intercepted by the valve 4 which may be of the cock or float type, a pipe 5 connecting the bottom of the reservoir with the suction end of a pump 6, more fully described hereinafter, which is at a lower level than that of the reservoir 1. Water is delivered by this pump along a pipe 7 which is completely devoid of intercepting or checking means, to the heat exchanger schematically illustrated at 8 which is situated inside a boiler 9 containing boiling water heated by an element 10 of any well known design; the water delivered by the pump 6 proceeds from the heat exchanger 8 along the tube 11, which is also devoid of intercepting or checking means, until it reaches the filter 12 of known design. The pump 6 is driven by a motor 13.

Figure 2:
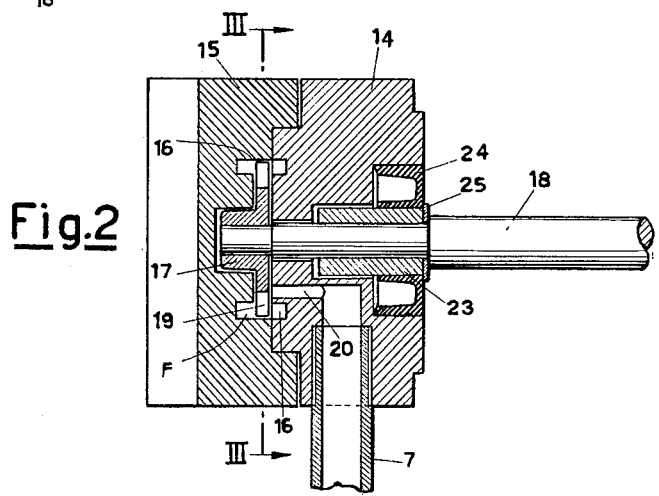
FIG. 2 shows an axial cross-section of the pump along line II—II of FIG. 3, which shows a cross-section of FIG. 2 along line III—III.

The pump 6, illustrated in detail in FIGURES 2 and 3, includes a body in two pieces 14 and 15 enclosing a chamber 16 in which there rotates an impeller 17 mounted on a shaft 18 driven by the aforesaid motor 13.

The impeller 17 is provided with blades 19 which, in rotating, travel round the chamber 16 and so cause the pressure in the vicinity of the outlet or delivery mouth 20 to increase in relation to the pressure in the vicinity of the inlet or suction mouth 21, between which two mouths there is, inside the chamber 16, a free path F and a restricted zone 22 which is crossed by the blades 19 with relatively little play.

The shaft 18 rotates in a sleeve 23 which is held in position with a certain play in a seat formed in the piece 14 by an annular gasket of U-shaped cross-section, seal 24, which provides a seal between the piece 14 and the sleeve 23 and may, if desired, be joined integrally with said sleeve. A second flat-section annular seal 25 provides a front seal between the end face of the sleeve 23 and a shoulder on shaft 18. This construction enables shaft 18 to adjust its position without harmful strains, and ensures a satisfactory seal through the effect of the pressure inside the pump acting on the seals 24 and 25.

The employment of the apparatus is manifest from the description given hereinabove of its construction. In order to deliver hot water to filter 12, it is sufficient to start motor 13 by means of the switch indicated schematically by 26, which may be operated by hand or in any other manner such as, for example, by means of a photo-electric cell sensitive to the presence of a cup placed under the filter 12, in which case switch 26 may be set for a time delay so that the cup is filled after the time necessary to prepare the infusion has elapsed.

The boiler 9 may also be used for the production of low pressure steam, and a safety valve, indicated by the numeral 27, is provided for this purpose.

It is important to observe that the apparatus hereinabove described is free from any form of interception of the water between the reservoir 1 and the filter 12, since not even the pump 6 is designed to form a seal when stationary.

As a consequence, when pump 6 stops, the difference in level between reservoir 1 and filter 12 causes water to be sucked back from the filter thus preventing the coffee powder in the filter from being excessively soaked with water.

In any case, furthermore, the employment of a rotary pump makes for economy and space-saving in particular, the type of pump hereinabove described, which operates by liquid friction, does not form a seal when stationary, and at the same time does not call for the excessive rotary speeds which would be required by a centrifugal type pump of very small diameter.

Other embodiments of the present invention are of course possible. One of these is schematically illustrated in FIG. 4 wherein the reference numerals correspond to those hereinabove used and refer to respectively similar parts.

In the case illustrated in FIG. 4, the reservoir 1 holds water which is kept hot by means, for example, of an electrical resistance 27 controlled by a thermostat switch schematically indicated by 28. The deliver pipe 7 of the pump 6 passes through the reservoir 1, whereby the water is brought up to its original temperature thus compensating for the heat losses during its passage through the pump 6.

This arrangement allows a very small compact apparatus to be built and lends itself to small machines for home use.

I claim:

1. Brewing apparatus comprising a water reservoir adapted for storing water under the pressure of ambient atmosphere, filter means adapted for accommodating an infusible powder, pumping means coupled to and adapted for pumping water from said reservoir to and through said filter means, said pumping means including an impeller and defining a pumping chamber in which said impeller is located, said chamber being provided with an inlet opening coupled to said reservoir and an outlet opening coupled to said filter, said impeller occupying a portion of said chamber and leaving a free path between said inlet and outlet openings, said reservoir and pumping means and filter means being connected in series to constitute a system, heating means in said system for heating said water, said filter means being at the extreme end of the system so that the water can be directly discharged from the system via said filter means, said filter means being elevated above the pumping means and at least part of said reservoir so that water can return to the reservoir via the free path in the pumping means when the latter is inactive.

2. Apparatus as claimed in claim 1 wherein said pumping means is lower than said reservoir.

3. Apparatus as claimed in claim 1 comprising a conduit coupling said pumping means to said filter means and wherein said heating means heats the water in said conduit.

4. Apparatus as claimed in claim 1 wherein said heating means is located in said reservoir for heating water therein and comprising a conduit coupling said pumping means to said filter means and passing in heat exchange relationship through said reservoir.

References Cited in the file of this patent

UNITED STATES PATENTS

| | | |
|---|---|---|
| 2,626,558 | Stein | Jan. 27, 1953 |
| 2,667,827 | Peters | Feb. 2, 1954 |
| 2,715,868 | Brown | Aug. 23, 1955 |
| 2,808,780 | Hoekstra | Oct. 8, 1957 |

FOREIGN PATENTS

| | | |
|---|---|---|
| 402,961 | Italy | Mar. 31, 1943 |